United States Patent [19]
Bienfait et al.

[11] Patent Number: 4,593,195
[45] Date of Patent: Jun. 3, 1986

[54] METHOD AND DEVICE FOR OBTAINING INFORMATION RELATIVE TO ORGANIC MATERIALS OR MINERALS LIKELY TO BE CONTAINED IN GEOLOGICAL FORMATIONS

[75] Inventors: Michel Bienfait, Marseilles; Bernard Durand, Rueil Malmaison; Jean Suzanne, Marseille; Philippe Ungerer, Rueil Malmaison, all of France

[73] Assignee: Institut Francais du Petrole, Malmaison, France

[21] Appl. No.: 596,602

[22] Filed: Apr. 4, 1984

[30] Foreign Application Priority Data

Apr. 5, 1983 [FR] France ............... 83 05657

[51] Int. Cl.[4] ............................... G01V 5/00
[52] U.S. Cl. ................... 250/253; 250/269
[58] Field of Search .............. 250/253, 256, 269

[56] References Cited

U.S. PATENT DOCUMENTS

| | | | |
|---|---|---|---|
| 3,906,224 | 9/1975 | Scott et al. | 250/269 |
| 4,047,027 | 9/1977 | Bateman et al. | 250/269 |
| 4,302,669 | 11/1981 | Allen et al. | 250/269 |
| 4,416,151 | 11/1983 | Ullo | 250/269 |

Primary Examiner—Janice A. Howell
Attorney, Agent, or Firm—Antonelli, Terry & Wands

[57] ABSTRACT

A method for obtaining information relating to material contained in geological formations. According to this method; these geological formations are subjected to at least one flow of so called incident neutrons having a substantially well defined energy, the incoherent inelastic diffusion spectrum of the diffused neutrons resulting from the interaction of the incident neutrons with the material contained in the geological formations is established at least partially, and from this spectrum are inferred certain of the energy amounts frequently transferred between the incident neutrons and molecules of the materials contained in the formations, or vice versa.

29 Claims, 10 Drawing Figures

METHOD AND DEVICE FOR OBTAINING INFORMATION RELATIVE TO ORGANIC MATERIALS OR MINERALS LIKELY TO BE CONTAINED IN GEOLOGICAL FORMATIONS

BACKGROUND OF THE INVENTION

1. Field of the Invention

The present invention relates to a method and a device for obtaining information relative to a given material, organic or mineral, likely to be contained in geological formations and in particular those passed through by a bore hole. With the present invention, more especially, the presence of certain materials in geological formations can be detected and the quantity of these materials may be possibly determined.

2. Description of the Prior Art

Up to the present time, the presence of certain materials, contained in geological formations, was indicated by the results of analyses made on samples of these geological formations, taken by special apparatus of the core barrel type, or coming from excavations material collected during drilling of these formations.

These analyses, which are for example chemical analyses or else analyses of the products resulting from the pyrolysis or the oxidation of the sample, are carried out at the surface and are relatively long to put into effect, since the most rapid require at least ten minutes or so per sample.

The prior art may be illustrated by the French Pat. Nos. 2.120.638 and 2.424.551, U.S. Pat. Nos. 4,317,993 and 3,665,195 as well as the following articles published in the "Canadian Journal of Physics":

article by R. A. COWLY entitled "Inelastic scattering of thermal neutrons from liquid helium" (Volume 49, No. 2 of the Jan. 15, 1971, Ontario (CA), pages 177 to 200), and article by J. R. D. COPLEY entitled "Crystal dynamics of rubidium. 1. Measurements and harmonic analysis" pages 657 to 675.

Experiment No. 9.06.327 mentioned in the 1980 annual report of the Institut Laue Langevin de Grenoble - France, with the title "Investigation of the vibrational state of butane adsorbed on graphite at low and high energy transfers", has shown that the incoherent inelastic diffusion spectrum of neutrons interacting with a layer of butane of a given thickness, adsorbed on a CARBOPACK.B (commercial trademark) graphite support medium, presents peaks in the vicinity of certain energy levels among which some are characteristic of the vibrations of the C—H pair, of the C—C pair and of a swinging movement of the group $CH_3$.

The present invention, whose aim is to allow rapid determination of the presence of certain materials in the geological formations through which a bore hole will pass, is based on the fact that the authors of the present invention have discovered similar phenomena in the incoherent inelastic diffusion spectrum of neutrons of a geological formation subjected to a flow of neutrons having a given energy level.

It is possible, according to the invention, to rapidly identify and/or determine the quantity of certain materials contained in geological formations. It is also possible to obtain other information concerning these formations, for example their hydrogen atom density.

An apparatus for carrying out measurements on geological formations passed through by a bore hole has been designed. These measurements are advantageously carried out at different levels in the bore hole so as to determine, depending on the depth and practically continuously, the ground zones where the desired material is present.

The recent experiment mentioned above was carried out on a given material, in this case butane, which was adsorbed on a special graphite support medium made from CARBOPACK.B (commercial trademark) by forming on the surface of the support medium a layer having an accurately known thickness.

Such conditions virtually do not exist in nature and it is to the merit of the inventors that they have discovered that by subjecting a geological formation sample to a neutron bombardment having appropriate energy, generally less than 1eV, the incoherent inelastic diffusion spectrum of the neutrons interacting with the material contained in the sample presents peaks corresponding to energy transfers, the value of the transferred energies being characteristic of certain materials contained in the geological formations. This energy transfer takes place from incident neutrons to certain molecules of the geological formations or conversely.

The inventors then studied the incoherent inelastic diffusion spectra of different geological samples whose composition had been determined by prior processes and established, for certain materials likely to be contained in geological formations, one or more reference values of the energy values for which the inelastic diffusion spectrum presents energy losses.

The method of the invention is advantageously applied to all kinds of organic materials, hydrocarbons, minerals, particularly argillaceous minerals, water and generally to hydrogenated materials.

In particular, it is possible to characterize the sedimentary hydrocarbons and organic materials in an oil reservoir or more generally in sedimentary rocks.

It is still within the scope of the present invention to apply it to the detection of other materials.

The present invention proposes subjecting geological formations to a bombardment by neutrons having a given energy and to detect in an incoherent inelastic diffusion spectrum of the energy of the neutrons reflected by the geological formations, the values of the energy ranges for which the spectrum presents peaks.

Each peak corresponds to a group of diffused neutrons having substantially the same energy. This energy is detected by the position of the peak in the spectrum. By comparing the value of the energies corresponding to the different peaks with the value of the energy of the incident neutrons, the amounts of elementary energies the most frequently transferred from the neutrons to certain molecules of the formations or conversely may be determined. By comparing these transferred elementary amounts with reference values, information may be inferred particularly qualitative information relating to the geological formations, such as the possible nature of certain materials contained in these formations. Tests have been carried out by using reference values close to 175 meV and/or 370 meV. By examining the size or intensity of the peaks, possibly of the incoherent elastic diffusion peak, the qualitative information may be confirmed, which was heretofore described, and/or quantitative information relating to some at least of the detected materials, such as the relative or absolute material contents may be obtained and information may be gathered relating to the density of protons or hydrogen atoms contained in the geological formations.

According to one particular embodiment of the invention, the presence of a material in the geological formations may be inferred from the analysis of the inelastic diffussion spectrum having one or more given energy values corresponding to the reference values established for this material.

The invention also provides a device for implementing the method for detecting the presence of certain materials in geological formations passed through by a drill hole.

SUMMARY OF THE INVENTION

Thus, the present invention proposes a method for obtaining geological information, it is characterized in that:

these geological formations are subjected to at least a flux or flow of so called incident neutrons having a substantially well defined energy, the incoherent inelastic diffusion spectrum of the diffused neutrons resulting from the interaction of the incident neutrons with the material contained in the geological formations is established, at least partially, and from this spectrum are inferred some of the energy amounts frequently transferred between the incident neutrons and molecules of the materials contained in the formations, or vice versa.

It is possible according to a variant of the method to subject the geological formations to several incident neutron flows, each of which has a substantially well defined energy.

In another variant, at least one so called reference set is known, comprising at least one transferred energy value, this set being characteristic of one at least of the desired data relating to materials likely to be contained in the geological formations and said datum is determined when transferred energy values, substantially equal to the values of the reference set, are inferred from the spectrum.

It is possible, in accordance with the invention, to produce a measurement signal, representative of the neutron flow, corresponding at least to some transferred energy values of the reference set. The values of said signals may also be compared, respectively, with predetermined thresholds and a signal produced significant of the datum which is characterized by the reference set, when the values of said measurement signals are respectively greater than those of said thresholds.

The different signals may be recorded as a function of the depth of the bore hole where the measurements are made.

The desired information may relate to the presence of at least one material in the geological formation.

According to a variant of the method, the intensity of the peaks of the spectrum corresponding to the different transferred energy amounts is measured. It is then possible, if at least one so called reference set is known comprising at least one transferred energy value, this set as well as the intensity of the peaks of the spectrum, corresponding to at least certain values of said reference set, being characteristic of one at least of the desired data relating to the materials contained in the geological formations, to deduce the desired information, by comparing the energy values effectively transferred with that of the reference set and by examining the intensity of the peaks of the spectrum corresponding to at least some of the energy values effectively transferred.

The desired information may relate to the presence and/or the amount of at least one material in the geological formation, just as it may relate to the presence of several materials in the geological formations and/or the relative amount thereof.

It is advantageous, according to certain variants of the method of the invention, to consider only the negative energy transfers, that is to say those corresponding to an energy loss of the incident neutrons, these transfers being more probable, at least, under certain conditions, particularly of temperature.

The given energy of an incident neutron flow will be advantageously slightly greater than the highest value of the transferred negative energies, that is to say greater than the highest energy loss of the incident neutrons which the flow is supposed to detect, more especially so as to obtain a good resolution of the measurement.

According to a variant of the method, from the total flow diffused by the formations compared with the incident neutron flow information relating to these formations may be inferred, more particularly their proton content.

The different variants proposed above may be taken separately or in combination, that is to say if they are compatible.

The present invention also provides a device for obtaining certain information relating at least to one material contained in geological formations through which a bore hole passes. This device, comprising a probe which may be introduced into the bore hole, fixed at the end of a handling cable, and means for transmitting the signals delivered by the probe is characterized in that it comprises at least one measuring cell having:

a source capable of producing a neutron flow, a monochromator capable of reflecting towards the geological formations only the neutrons which have an energy of a given value ($E_{oa}$, $E_{oc}$) and detection means adapted to produce a measurement signal representative of the flow of neutrons diffused by the geological formations and whose energy ($E_{sa}$, $E_{sc}$) differs from said energy of given value ($E_{oa}$, $E_{oc}$) by a transferred energy amount ($\Delta E_a, \Delta E_c$).

The source may comprise a neutron emitter and a thermalizer which, on receiving the neutrons emitted by the emitter, produces a neutron flow having a smaller energy.

The neutron emitter may be a Californium 252 emitter and the thermalizer may be formed of deuterium oxide.

The detection means may comprise a neutron analyser and detector, the analyser being adapted to reflect towards the detector the neutrons diffused by the geological formations whose energy ($E_{sa}$, $E_{sc}$) differs from said energy of given value ($E_{oa}$, $E_{oc}$) by a transferred energy amount ($\Delta E_{ea}$, $\Delta E_c$).

The detection means may also comprise a neutron filter and detector, the filter being adapted to let through in the direction of the detector only the neutrons diffused by the geological formations whose energy ($E_{sa}$, $E_{sc}$) is substantially equal to said given energy value $E_{oa}$ modified by the transferred energy amount ($\Delta E_a$, $\Delta E_c$).

The monochromator and the analyser are formed possibly by crystals cut along a given plane and respectively placed with respect to said source and to said detector in positions providing a Bragg reflection through a given angle.

The crystals may be mobile about an axis for modifying the Bragg reflection angle.

According to a variant of the device, the source emits its neutrons in a direction substantially perpendicular to the axis of the probe.

In another variant of the device, the source emits its neutrons in a direction substantially parallel to the axis of the probe.

The device according to one of the preceding variants which is designed to obtain information relative to a material likely to be contained in formations and for which at least one reference value is known for energy transferred during the interaction of the neutrons with the same material, may comprise at least:
- a first measuring cell emitting neutrons having a given energy and detecting diffused neutrons whose energy differs from said given energy by an amount substantially equal to the transferred energy reference value,
- a second measuring cell emitting and detecting neutrons whose energy has a value for which said diffusion spectrum of the material reveals practically no energy absorption.

The device of the invention may comprise means for processing the signals delivered by the two measuring cells and is characterized in that these processing means comprise a differential circuit delivering a signal proportional to the difference of the signals delivered by the measuring cells and a comparator circuit delivering a signal signifying the presence of the desired material in the geological formations when the signal delivered by the differential circuit is greater than a predetermined threshold value.

The cell may be supported by a measurement part adapted to come into contact with the geological formations during the measurements.

The device of the invention may be equipped with at least one detector, adapted to measure one at least of the flows having a given energy.

The device of the invention may also be equipped with at least one detector, adapted to measure the flow diffused by the geological formations.

BRIEF DESCRIPTION OF THE DRAWINGS

The invention will be well understood and all of its advantages will appear clearly from the following description, illustrated by the accompanying Figures in which.

DESCRIPTION OF THE PREFERRED EMBODIMENTS

Figure 1A:
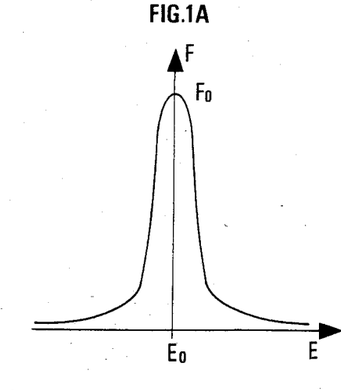
FIGS. 1A and 1B illustrate schematically the principles on which the present invention is based.
Figure 1B:
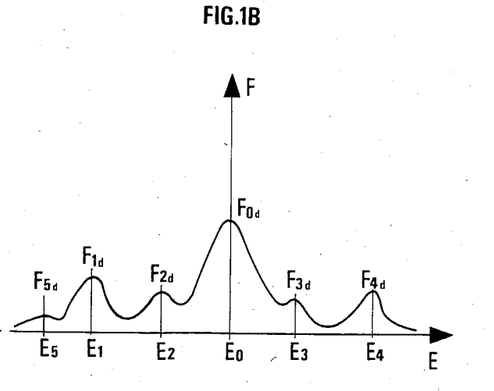

In FIGS. 1A and 1B, the abscissa represent the energy E of the neutrons, and the ordinates the flow F of the neutrons.

These two Figures are only given to facilitate understanding of the invention and moreover the respective scales of these two Figures do not correspond.

FIG. 1A shows the energy spectrum of the neutrons directed towards the geological formations to be explored, these neutrons will be called incident. FIG. 1B shows the spectrum of the neutrons reflected by these formations, these neutrons will be called diffused. The neutrons emitted towards the formations are substantially monochromatic, that is to say centered substantially about the same energy level ($E_o$).

The maximum value of the flow of the incident neutrons is represented by the letter $F_o$.

The maximum values of the low peaks of the diffused neutrons are referenced $F_{od}$, $F_{2d}$, $F_{3d}$, $F_{4d}$, and $F_{5d}$, and correspond respectively to the energy levels referenced $E_o$, $E_1$, $E_2$, $E_3$, $E_4$ and $E_5$.

It is the values of the elementary energies transferred between the incident neutrons and the geological formations which supply information relating to these geological formations. Thus, what will be important in the schematical example of FIGS. 1A and B, will be the following values:

$$\Delta E_1 = E_1 - E_0$$

$$\Delta E_2 = E_2 - E_0$$

$$\Delta E_3 = E_3 - E_0$$

$$\Delta E_4 = E_4 - E_0$$

and $$\Delta E_5 = E_5 - E_0$$

The quantitative information, relative to certain elements of the materials contained in the formations, may be obtained from a comparative study of some of the maximum values of the flows $F_{id}$ and $F_0$ and/or of the shape of some of the peaks, this latter more especially for integrating the flow in the vicinity of a peak.

The different magnitudes given above may be standardized, relatively to the incident neutron flow.

By comparing the integral of the incident flow with the integral of the whole of the diffused flow, the hydrogen atom density of the formations may be determined.

The number of peaks to be taken into consideration will vary depending on the desired information. Thus, it is possible, in certain embodiments of the invention to consider only one or two peaks.

It should be noted that generally, at certain temperature levels, the peaks corresponding to energy losses of the incident neutrons are larger and so consequently it is advantageous, under certain conditions, to work solely with the energy loss spectrum of the incident neutrons.

Figures 2, 3:
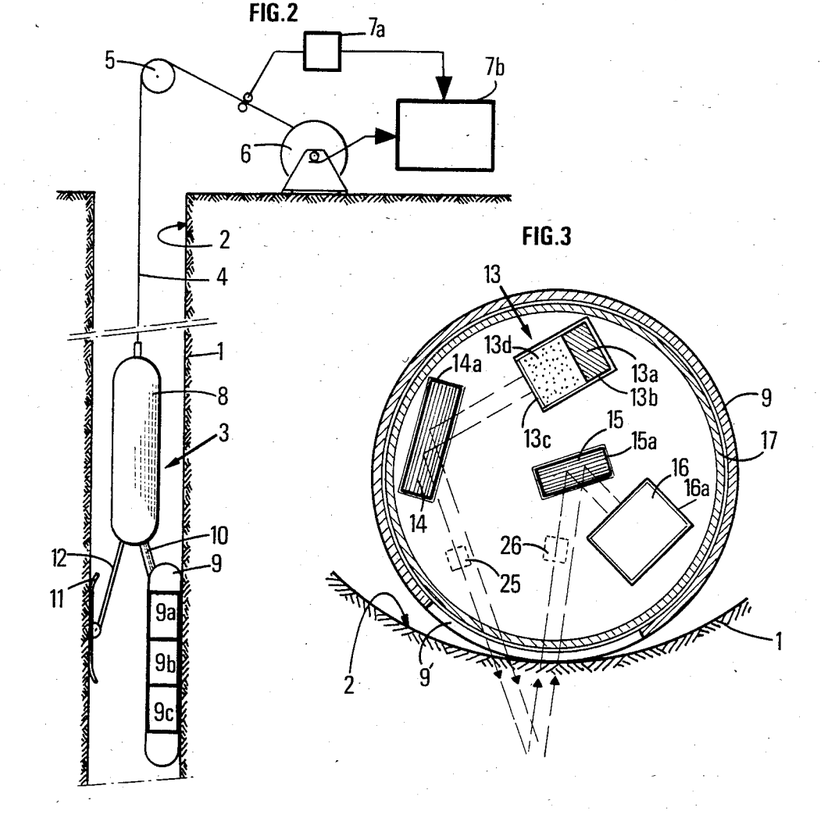
FIG. 2 shows schematically a measuring probe in accordance with the invention.
FIG. 3 shows a first embodiment of a measuring cell.

FIG. 2 shows schematically a first embodiment of a device in accordance with the invention, used for detecting the presence of certain materials in geological formations 1 through which a bore 2 passes.

This device comprises a probe, designated generally by the reference 3, which is suspended from the end of a carrier cable 5 in which are incorporated for example electrical conductors. These conductors serve for supplying the probe with electrical power and for transmitting electric signals between the probe and the surface installation.

Cable 4 passes over a pulley 5 and is wound on the drum of a winch 6. Means 7a measure the travel of the cable at the surface so as to determine the position of the probe in the well. These means 7a deliver a signal representing the position of the probe in the well 2. This signal is transmitted to an apparatus 7b. The electrical conductors of cable 4 are connected at the surface to the apparatus 7b where, depending on the position of probes 3 in well 2, the signals delivered by the probe are recorded and/or displayed and, if required, processed.

Probe 3 comprises a body 8 in which are housed the electronic circuits required for operation of the probe and for transmitting the signals. The probe also comprise a measuring shoe 9 connected to body 8 by a hinged arm 10 allowing the measuring shoe to be placed in contact with the wall of the well. A second shoe 11, fixed to the probe body by a hinged arm 12, is provided in a position diametrically opposite the measuring shoe 9. Probe body 8 may be possibly equipped with centering devices, not shown.

Measuring shoe 9 comprises at least one cell for measuring or detecting at least one material likely to be contained in the geological formations 1.

In the case shown in FIG. 1, by way of non limiting example, the measuring shoe 9 is equipped with three measuring cells 9a, 9b, 9c.

FIG. 3 shows, in section through a plane perpendicular to the axis of the measuring shoe, a first embodiment of the measuring cell.

This measuring cell comprises:
- a source 13 emitting neutrons in a direction substantially perpendicular to the axis of the probe,
- a first neutron monochromator, for example a crystal cut as a Bragg reflector 14 which reflects some of the neutrons emitted by source 13 in the direction of the geological formations 1,
- an analyser 15, which may also be a neutron monochromator, formed by a cut crystal which receives neutrons emitted by the geological formations and reflects some of them in a given direction, and
- a neutron detector 16, which picks up the neutrons reflected by the analyser 15 in a direction substantially perpendicular to the axis of the probe.

Neutron source 13 is formed by a neutron emitter 13a of the type commercialized by the French atomic energy commission. This emitter is for example a radium-beryllium, or antimony-beryllium or californium 252 neutron emitter. Emitter 13a is placed in a case 13b made from a material absorbing the neutrons, for example from cadmium, and having a wall portion or "window" 13c for allowing the neutrons to pass therethrough in a direction substantially perpendicular to the axis of shoe 9. This "window" is made for example from stainless steel or aluminum. Between the "window" 13c and the emitter 13a is interposed a neutron retarding product 13d such for example as deuterium oxide $D_2O$ (heavy water) or graphite which, on receiving the flow of neutrons produced by emitter 13a, emits a flow of neutrons some of which have the energy which has been chosen for bombarding the target.

The source 13 thus formed emits a neutron flow having for example a neutron rate of at least $10^8$ per second.

The first Bragg reflector 14 is placed in the path of the neutrons emitted by source 13 and reflects towards the geological formations 1 a neutron flow whose energy is chosen preferably in relation with one of the values corresponding to the material whose presence it is desired to detect in the geological formations. Thus, as has already been mentioned, this first Bragg reflector is a monochromator which selects the neutrons emitted by source 13 while reflecting towards the geological formations only those neutrons which have a certain energy level. This monochromator is for example a crystal cut through a plane providing a well defined Bragg reflection which corresponds to the energy of the neutrons which it is desired to select. This monochromator may for example be formed by a copper crystal cut, more especially through one of the planes (111), (200), (220) or (331) or a silicone crystal cut through one of the planes (111) or (311) or else pyrolitic graphite.

The definition of the cutting planes is given in accordance with the international crystallography table.

This monochromator is placed in protecting case 14a made for example from stainless steel or aluminium.

The second Bragg reflector 15 is placed outside the path over which travel the neutrons emitted by source 13 and reflected by the first Bragg reflector 14. It selects the neutrons diffused by the geological formations 1 by only reflecting those whose energy differs from the energy of the neutrons emitted by a characteristic value of the desired material.

This analyser may be formed by a crystal cut along a plane providing a well defined Bragg reflection such for example as a germanium crystal cut through plane (220) or (111), or a zinc crystal cut through its base plane (002). This analyser is protected by a case 15a made for example from stainless steel or aluminium.

The detector 16 may be a neutron detector of any known type, such as a boron counter, a boron scintillator a lithium 6 detector, or a helium $He^3$ counter.

This counter is placed in a metal case 16a with its supply and delivers an electric signal representing the diffused neutron flow received by the analyser.

The above described measuring assembly is placed in a sealed pressure tight case 17 and is formed for example of stainless steel or aluminium.

The sealed case 17 is placed in shoe 9 which is formed by a sealed metal casing made for example from stainless steel or aluminium. Preferably a screen absorbing the neutrons, for example a cadmium screen, protects a part of the inner surface of shoe 9 while leaving free a portion of this wall inserted in the path of the neutrons reflected by the Bragg reflector 14 and in the path of the neutrons diffused by the geological formations in the direction of the analyser 15, this wall portion 9' forming a "window" for the passage of the neutrons.

Figure 4:
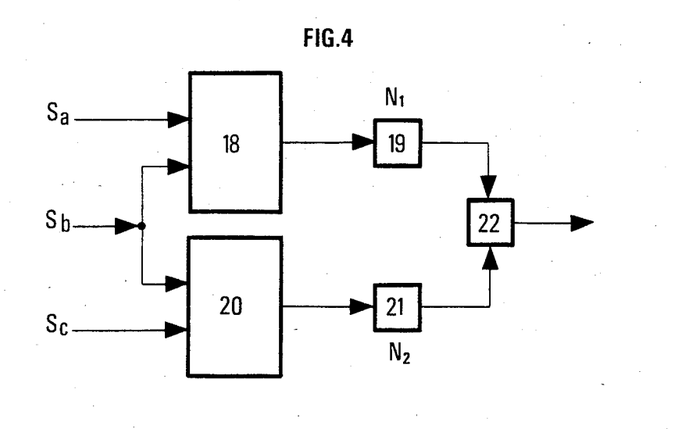
FIG. 4 illustrates the processing of the signals delivered by the measuring cells.

The operation of the probe is described below with reference to FIGS. 2 and 4.

It is assumed first of all that, from previous experiments, the incoherent inelastic diffusion spectrum is known of neutrons interacting with a material M identified and likely to be contained in the geological formations. It is also assumed that this spectrum comprises at least two peaks corresponding to two values of transferred energy $\Delta E_a$, $\Delta E_c$, for example 175 meV and 370 meV, the knowledge of these two values being considered sufficient for characterizing the material M such as heavy oil, or more generally hydrocarbons or other sedimentary organic materials.

Probe 3 is then equipped with three measuring cells 9a, 9b and 9c. The first one 9a is adjusted to emit towards the geological formations a flow of neutrons of energy $E_{oa}$ and so as to detect in the flow of neutrons diffused by formations 1, those which have an energy:

$$E_{1a} = \Delta E_a + E_0 a.$$

A second measuring cell, for example cell 9c, is adjusted to emit towards the geological formations a flow of neutrons of energy $E_{0c}$ and to detect in the flow of neutrons diffused by the geological formations 1 those which have an energy $E1c = \Delta E_c + E_{0c}$.

The third measuring cell 9b is adjusted so as to detect the neutrons diffused by the geological formations 1, which have transferred an energy $\Delta E_b$, this value being characteristic of none of the materials contained in the formations. Its purpose is to evaluate the background noise.

Probe 3 is then introduced into the well to the lowest level where it is desired to made the measurements. The probe is actuated so as to place shoe 9 in contact with the wall of the well.

The measurements are made by the measuring cells 9a, 9b and 9c.

Cells 9a, 9b and 9c deliver measurement signals $S_a$, $S_b$ and $S_c$ respectively proportional to the flow of neutrons picked up by the detector having an energy $\Delta E_a$, $\Delta E_b$ and $\Delta E_c$.

The signals are transmitted to the electronic apparatus, contained for example in body 8 of the probe, which allows the signals $S_a$ and $S_c$ to be corrected so as to take into account a parasite signal or background noise. For that, signals $S_a$ and $S_b$ are applied to the input circuit 18 which delivers at its output terminal a signal proportional to the difference of signals $S_a$ and $S_b$. This signal is then transmitted to a threshold circuit 19 preset to a value N1 and which delivers a first indicator signal for knowing whether the signal delivered by circuit 18 is less or greater than the threshold.

In the same way signals $S_b$ and $S_c$ are applied to a circuit 20 which delivers at its output terminal a signal proportional to the difference between signals $S_b$ and $S_c$. This signal is then transmitted to a threshold circuit 21 preset to a value N2 and which delivers an indicator signal for knowing whether the signal delivered by circuit 20 is less or greater than the threshold N2.

The indicator signals are applied to an analysis circuit 22 which delivers a signal when the signals delivered by circuits 18 and 20 are simultaneously respectively greater than thresholds N1 and N2, this signal indicating the presence of the material M in the geological formation.

The signal delivered by circuit 22 is transmitted to the surface by the conductors of cable 4 and recorded by apparatus 7 as a function of the depth at which the probe is located.

By pulling on cable 4, the probe is raised to the surface while continuously carrying out the above indicated measurements.

It is also possible to have a cell for detecting the background noise per transferred energy measurement cell. The background noise detection cells may comprise only an analyser and a detector.

The example of processing, corresponding to the diagram of FIG. 2, is a simple processing for confirming or disproving the presence of a material in the geological formations. Other types of processing may be used still within the scope of the invention. It is possible, in accordance with the invention, to use processing methods which take into account, among other things, the intensity of the different signals delivered by the detectors, more especially so as to obtain quantitative information relating to certain materials contained in the geological formations. In this case, it is possible to use the first processing method (FIG. 4) for triggering, should a material be detected, another processing method for obtaining quantitative information relative to the formations.

It may be important, in some cases, particularly for obtaining quantitative information, to know the flow of the neutrons emitted towards the geological formations. This flow may be determined by a knowledge of the characteristics of the neutron sources and of the monochromator, however, so as to be free of the possible variations of these characteristics in time, it is possible to use a detector 25, shown with a broken line in FIG. 3, for measuring the flow emitted by the monochromator 14.

It is advantageous to use a detector 26, shown with broken lines in FIG. 3, for measuring a flow characteristic of all the neutrons diffused by the formations. With this measurement, the flow measured by the detector 16 may be standardized and quantitative information relative to the formations obtained.

This detector 26 may be used in a first stage for the rapid detection of the protons, even if it entails making a longer count in the interesting zones for measuring the transferred energy amounts characteristic of the desired materials.

Of course, the processing of signals $S_a$, $S_b$ and $S_c$ may be carried out on the surface in real time or after recording of the values of these signals as a function of the depth of the probe in well 2.

In addition, the measuring shoe may be equipped with a sufficient number of measuring cells for analysing simultaneously the energy levels characteristic of several materials which it is desired to detect in the geological formations 1.

Figure 5:
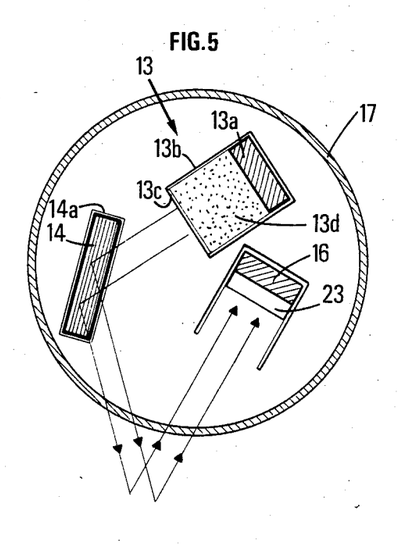
FIG. 5 illustrates a second embodiment of the measuring cell.

FIG. 5 shows another embodiment of a measuring cell. This measuring cell comprises a source 13 and a monochromator 14 identical to those shown in FIG. 2.

In this embodiment, detector 16 counts the neutrons diffused by the geological formations and which have passed through a beryllium filter 23 inserted between the detector 16 and the geological formations subjected to bombardment by the neutrons reflected by monochromator 14. The beryllium filter is a low pass filter for the neutrons. It only lets through the neutrons having an energy less than about 4 meV. Thus, if the cell of FIG. 5 is intended for measuring the flow of neutrons having transferred an energy $\Delta E$, the energy E of the neutrons emitted by the monochromator 14 will have to be between $\Delta E$ and $\Delta E + 4$ meV.

Of course, it is possible to use another filter. It will then be advisable for the neutrons emitted by the cell towards the formation to have an energy determined from the characteristics of the filter used.

The embodiment described with reference to FIG. 5 will be more particularly used for the transfer of high energies, generally greater than 50 meV and preferably between 50 meV and 600 meV.

Figure 6:
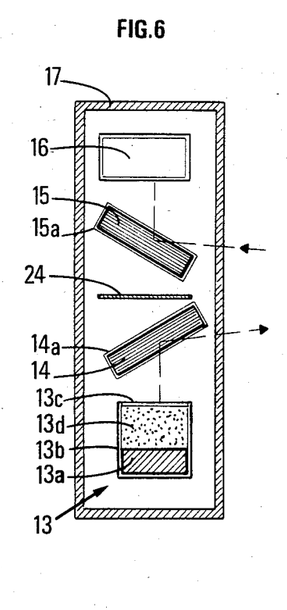
FIGS. 6 and 7 show other embodiments of a measuring cell.

FIG. 6 shows a first variant of the measuring cell shown in FIG. 2.

According to this embodiment, the neutron emitting source 13 is disposed so as to emit its neutron flow in a direction parallel to the axis of the probe.

Monochromator 14 selects the neutrons having a given energy $E_6$ and reflects them towards the geological formations. The neutrons diffused by these geological formations which reach the analyser 15 are selected and reflected in a direction parallel to the axis of the probe towards detector 16. A screen 24 absorbing the neutrons is interposed between source 13 and sensor 16. This screen is for example formed from cadmium and prevents the neutrons emitted by source 13 from directly reaching sensor 16.

Figure 7:
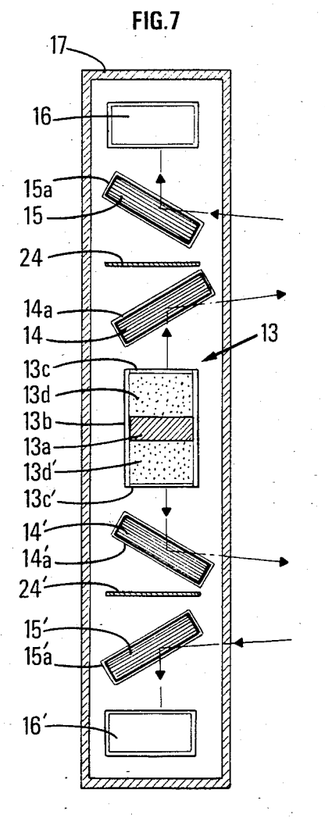

FIG. 7 shows another embodiment which uses a single source 13 emitting in two opposite directions.

The upper part of this measuring cell is similar to the measuring cell described with reference to FIG. 6 and comprises a monochromator 14, an analyser 15 and a detector 16 cooperating for analysing the neutrons diffused by the geological formation and having transferred a certain amount of energy $\Delta E_6$.

The lower part of the measuring cell comprises a monochromator 14, an analyser 15 and a sensor 16 cooperating for analysing the neutrons diffused by the geological formation and having transferred an energy $\Delta E\ 6$.

Of course, it will be possible in the embodiments illustrated in FIG. 6 to replace the sensor 16 and the associated analyser 15 by a sensor associated with a filter, as shown in FIG. 5, the sensor then being orientated so as to receive directly through a filter 23 the neutrons diffused by the geological formations. The same goes for FIG. 7.

According to another embodiment, it will be possible, by rotation about an axis, to modify the position of the monochromator and of the analyser with respect to the neutron source and to the sensor respectively, so as to modify the Bragg reflection angle and so the energy level of the selected neutrons. Thus, the same measuring cell may be used for analysing, at different energy levels, the incoherent inelastic diffusion spectrum of the neutrons interacting with the material contained in the geological formations.

Other modifications may be made without for all that departing from the scope and spirit of the invention.

Figure 8:
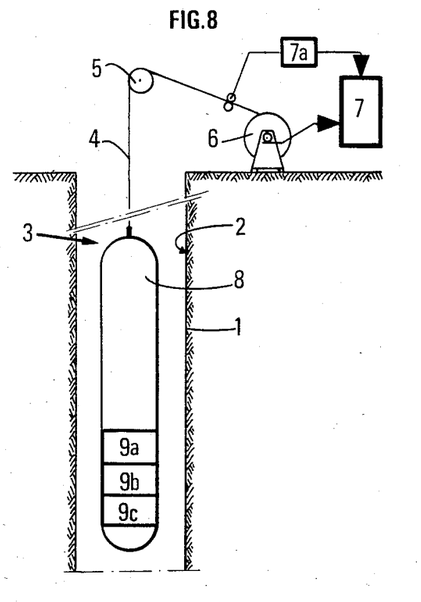
FIGS. 8 and 9 show schematically different embodiments of the measuring probe in accordance with the invention.

In fact, in the foregoing a probe has been shown for which the measuring assemblies are supported by a measuring shoe which, during operation of the probe, is in contact with the geological formations. However, and in particular for small diameter bore holes, it is possible to provide a probe whose body is equipped with different measuring cells 9a, 9b, . . . as shown in FIG. 8. In this case, the measurements made take into account the presence of the liquid which generally fills the bore hole 2.

Figure 9:
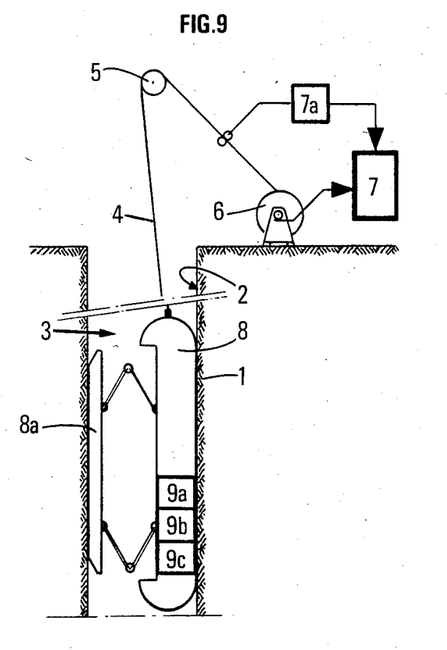

It is also possible to provide off centering in the bore hole of the probe body 8 equipped with measuring cells by means of a mobile part of the probe, such as an offcentering shoe $8_a$ (FIG. 9). In this case, the measuring cells are in contact with the wall of the well and the liquid filling the bore hole has practically no influence on the measurements.

The analysers may be replaced by apparatus implementing the "flight time" method which is a known method and which, consequently, will not be described here.

Good results have been obtained by emitting neutron flows having a given energy between 10 and 500 meV.

What is claimed is:

1. A method for obtaining information relating to at least one material contained in geological formations, wherein:
   said geological formations are subjected to at least one flow of incident neutrons having a substantially well defined energy,
   the incoherent inelastic diffusion spectrum of the diffused neutrons resulting from the interaction of the incident neutrons with the at least one material contained in the geological formations is established at least partially, and
   from this spectrum are inferred certain of the energy amounts frequently transferred between the incident neutrons and molecules of the at least one material contained in the formations.

2. The method as claimed in claim 1, wherein information relating to said formations is derived from the total flow diffused by the formations compared with the flow of incident neutrons.

3. The method as claimed in claim 1, wherein only the negative energy transfers are considered, said negative energy transfers corresponding to an energy loss of the incident neutrons.

4. The method as claimed in claim 1, characterized in that said geological formations are subjected to several flows of incident neutrons each of which has a substantially well defined energy.

5. The method as claimed in claim 1, wherein a reference set is known comprising at least one transferred energy value, this set being characteristic of one at least of the desired data relating to materials contained in the geological formations, and said datum is determined by inferring from the spectrum transferred energy values substantially equal to the values of the reference set.

6. The method as claimed in claim 5, wherein the reference set comprises at least one transferred energy value close to 175 meV or 370 meV.

7. The method as claimed in claim 5, wherein the measurement signal is produced representative of the neutron flow corresponding at least to transferred energy values of the reference set.

8. The method as claimed in claim 7, wherein the value of said signals are compared respectively with predetermined thresholds and a signal is produced significative of the information characterized by said reference set when the values of said measurement signals are respectively greater than those of said thresholds.

9. The method as claimed in claim 8, wherein said signals are recorded as a function of the depth of the bore hole where the measurements are made.

10. The method as claimed in one of the preceding claims, characterized in that one at least of the desired data relates to the presence of at least one material in the geological formations.

11. The method as claimed in claim 1, wherein the intensity of the peaks of the spectrum corresponding to the different transferred energy amounts is measured.

12. The method as claimed in claim 11, wherein at least one reference set is known comprising at least one transferred energy value, this set and the intensity of the peaks of the spectrum corresponding to at least certain values of said reference set being characteristic of one at least of the desired data relating to material contained in the geological formations and the desired datum is inferred by comparison of the energy values effectively transferred with that of the reference set and by studying the intensity of the peaks of the spectrum corresponding to at least some of the energy values effectively transferred.

13. The method as claimed in claim 11, wherein one at least of the desired data relates to the presence and/or amount of at least one material in the geological formation.

14. The method as claimed in claim 11, wherein one at least of the desired data relates to the presence of several materials in the geological formations and the relative amount thereof.

15. The method as claimed in claim 1, wherein the level of the given energy of an incident neutron flow is slightly greater than the highest value of the transferred negative energies, that is to say greater than the highest energy loss of the incident neutrons which this flow is supposed to detect.

16. In a device for obtaining certain information relating to at least one material contained in geological formations through which a bore hole passes, said device comprising a probe which may be introduced into the bore hole, fixed at the end of a handling cable and means for transmitting the signals delivered by the probe, and at least one measuring cell comprising:

a source capable of producing a neutron flow, a monochromator capable of reflecting towards the geological formations only those neutrons which have an energy of a given value, and detection means adapted to produce a measurement signal representative of the flow of neutrons diffused by the geological formations and whose energy differs from said energy of given value by a transferred energy amount.

17. The device as claimed in claim 16, wherein said source comprises a neutron emitter and a thermalizer which, on receiving the neutrons emitted by the emitter, produces a flow of neutrons having a lower energy.

18. The device as claimed in claim 17, wherein said neutron emitter is a californium 252 emitter and said thermalizer is formed of deuterium oxide.

19. The device as claimed in claim 17, wherein said detection means comprises a neutron analyser and detector, the analyser being adapted to reflect towards the detector the neutrons diffused by the geological formations whose energy differs from said energy of given value by a transferred energy amount.

20. The device as claimed in claim 17, wherein said detection means comprise a neutron filter and a detector, said filter being adapted to let pass in the direction of the detector only the neutrons diffused by the geological formations whose energy is substantially equal to said given energy value modified by the transferred energy amount.

21. The device as claimed in claim 19, wherein said monochromator and said analyser are formed by crystals cut along a given plane and placed respectively with respect to said source and to said detector in positions allowing a Bragg reflection through a given angle.

22. The device as claimed in claim 21, wherein each of said crystals is mobile about an axis for modifying the Bragg reflection angle.

23. The device as claimed in claim 20, wherein said source emits its neutrons in a direction substantially perpendicular to the axis of the probe.

24. The device as claimed in claim 20, characterized in that said source emits its neutrons in a direction substantially parallel to the axis of the probe.

25. The device as claimed in either claim 23 or claim 24, used for obtaining information relative to a material likely to be contained in the formations and for which at least one reference value is known for energy transferred during the interaction of the neutrons with the same material, which device further comprises:

a first measuring cell emitting and detecting neutrons whose energy is substantially well defined, a second measuring cell emitting and detecting neutrons whose energy has a value for which said diffusion spectrum of the material reveals practically no energy absorption.

26. The device as claimed in claim 25, further comprising means for processing the signals delivered by said two measuring cells, wherein said processing means comprise a differential circuit delivering a signal proportional to the difference of the signals delivered by said measuring cells and a comparator circuit delivering a signal significative of the presence of the desired material in the geological formations when the signal delivered by the differential circuit is greater than a predetermined threshold value.

27. The device as claimed in claim 16, wherein said cell is supported by a measuring shoe adapted to come into contact with the geological formations during the measurements.

28. The device as claimed in claim 16, characterized in that is comprises at least one detector adapted for measuring at least one of the flows having a given energy emitted towards the formations.

29. The device according to claim 16, comprising at least one detector adapted for measuring the flow diffused by the formations.

* * * * *